(12) United States Patent
Leigh et al.

(10) Patent No.: US 10,514,508 B2
(45) Date of Patent: Dec. 24, 2019

(54) LATERALLY MATED OPTICAL CONNECTORS

(71) Applicant: HEWLETT PACKARD ENTERPRISE DEVELOPMENT LP, Houston, TX (US)

(72) Inventors: Kevin B. Leigh, Houston, TX (US); Paul Kessler Rosenberg, Palo Alto, CA (US); Sagi Mathai, Palo Alto, CA (US); Mir Ashkan Seyedi, Palo Alto, CA (US); Michael Renne Ty Tan, Palo Alto, CA (US); Wayne Victor Sorin, Palo Alto, CA (US); Marco Fiorentino, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/966,362

(22) Filed: Apr. 30, 2018

(65) Prior Publication Data

US 2019/0331858 A1   Oct. 31, 2019

(51) Int. Cl.
*G02B 6/30* (2006.01)

(52) U.S. Cl.
CPC .................................... *G02B 6/30* (2013.01)

(58) Field of Classification Search
None
See application file for complete search history.

(56) References Cited

U.S. PATENT DOCUMENTS

| 6,456,768 | B1 | 9/2002 | Boncek et al. |
| 6,945,712 | B1* | 9/2005 | Conn .................. G02B 6/3897 385/92 |
| 7,594,764 | B2 | 9/2009 | Palmer et al. |
| 9,128,248 | B2 | 9/2015 | Lam et al. |
| 9,377,588 | B2 | 6/2016 | Nishimura et al. |
| 9,429,717 | B2 | 8/2016 | Nakama et al. |
| 2016/0231521 | A1 | 8/2016 | Smith et al. |

* cited by examiner

*Primary Examiner* — Chad H Smith
(74) *Attorney, Agent, or Firm* — Hewlett Packard Enterprise Patent Department

(57) ABSTRACT

In example implementations, an optical connector is provided. The optical connector includes a jumper holder, a base bracket, and an optical ferrule. The jumper holder holds a plurality of ribbon fibers. The base bracket is coupled to an electrical substrate to mate with the jumper holder. The optical ferrule is coupled to an end of each one of the plurality of ribbon fibers. The optical ferrule is laterally inserted into a corresponding orthogonal socket that is coupled to a silicon interposer on the electrical substrate to optically mate the optical ferrule to the orthogonal socket.

8 Claims, 6 Drawing Sheets

LATERALLY MATED OPTICAL CONNECTORS

BACKGROUND

Communication signals can be transmitted over different types of mediums. Some mediums may be an optical medium, such as glass or clear plastic that can transmit optical communication signals over different wavelengths of light.

The optical communication signals can be transmitted by a laser over a passive optical fiber and received by a photodiode. An integrated chip or processor can be connected to the lasers and the photodiodes to control transmission of the optical signals, reading the optical signals, converting the optical signals to electrical signals, and the like. The passive optical fiber can be mechanically coupled to the laser and the photodiode.

DETAILED DESCRIPTION

Examples described herein provide an optical connector that is split to include a cable holder/bracket component and a laterally mated optical connector. As discussed above, different mechanical connectors can be used to connect the passive optical fiber to the laser and/or the photodiodes of an optical transceiver. However, current mechanical connectors use a single piece socket connector that mates vertically into a receiving socket on a silicon interposer. Due to the relatively large size of the socket connector, a large amount of surface area of the silicon interposer is used for the receiving socket. As a result, the overall size of the silicon interposer may be unnecessarily large.

In addition, the socket connector is mated vertically into the receiving socket. In other words, a user may press down on the socket connector and apply a force directly onto the receiving socket and the silicon interposer. This force can cause damage to the silicon interposer, which may damage the functionality or performance of the optical transceiver.

Examples of the present disclosure provide an optical connector that is split to include a laterally mated optical connector. The laterally mated optical connector may slide horizontally (e.g., laterally) into an orthogonal socket mounted on the silicon interposer. The light signals may be transmitted vertically through the orthogonal socket optically coupled to the laterally mated optical connector The cable holder/bracket component may be separated from the laterally mated optical connector to reduce the amount of surface area used on the silicon interposer to make the optical connection. Thus, the overall size of the silicon interposer may be reduced.

In addition, by laterally inserting the laterally mated optical connector into the orthogonal socket, the force applied to the silicon interposer may be reduced. As a result, the silicon interposer may be less likely to be damaged when the optical fiber is being connected.

Figure 1:
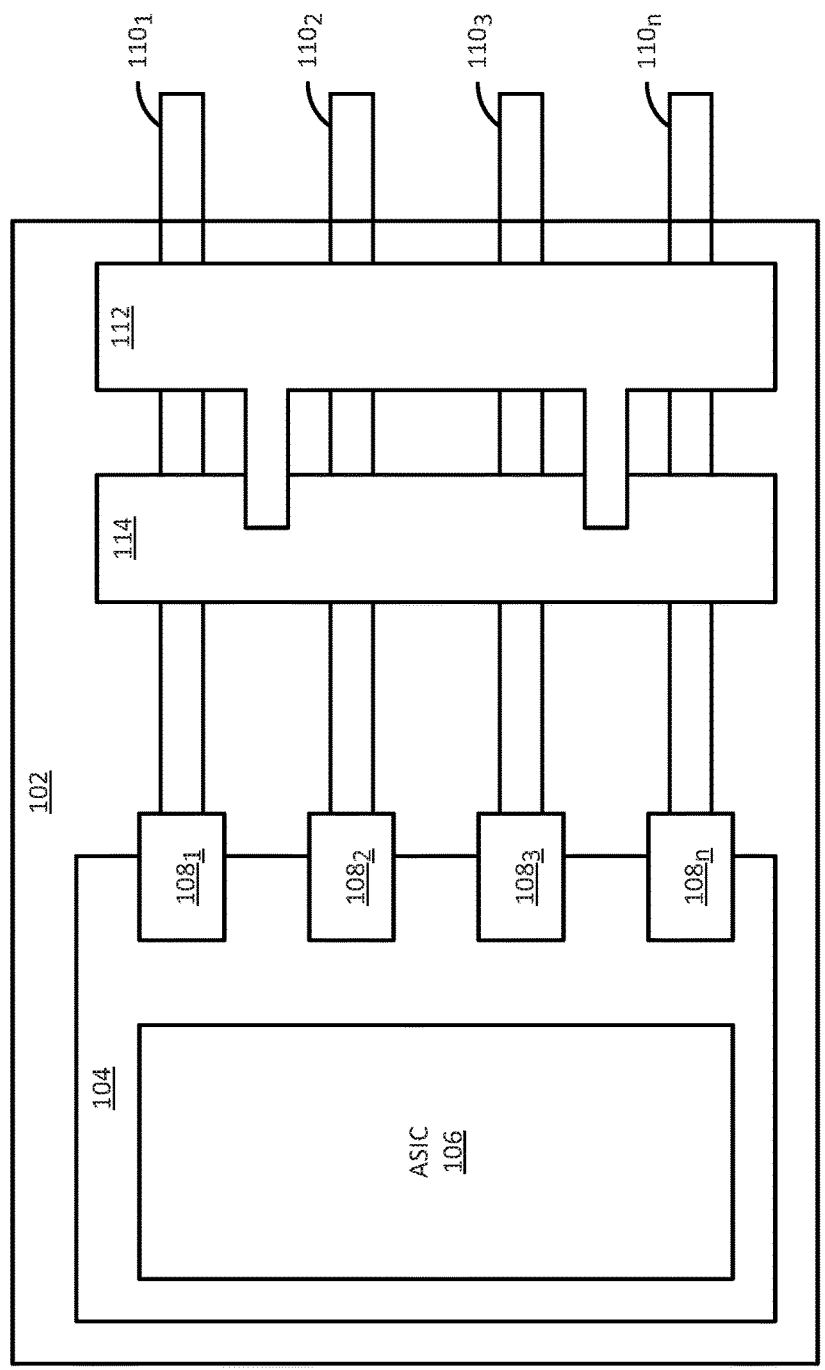
FIG. 1 is a block diagram of a top view of an optical transmitter with laterally mated optical connectors of the present disclosure.

FIG. 1 illustrates a top view of an optical transmitter 100. The optical transmitter 100 may be part of an optical communication device, such as for example, a switch, a wavelength division multiplexing (WDM) device, and the like.

In one example, the optical transmitter 100 may include an electrical substrate 102 (e.g., a printed circuit board (PCB)), a silicon interposer 104, and an electrical die 106 (e.g., an application specific integrated circuit (ASIC) chip). The electrical die 106 may be communicatively coupled to lasers or light sources (not shown) that emit light (also referred to as a light signal) through the silicon interposer 104.

The light may be a continuous-wave light having one or more wavelengths (e.g., comb lasers). The light source may be integrated or external to the silicon interposer 104. A continuous wave light may be modulated within a silicon modulator on the silicon interposer 104 that is driven by electrical signals from the electrical die 106. The electrical substrate 102 may be mounted on a system board (not shown) to electrically couple to other parts of a communication system. In some examples, a communication system may be a computer system, a network switch system, and the like.

In one example, the optical transmitter 100 may also include orthogonal sockets $108_1$-$108_n$ (also referred to herein individually as an orthogonal socket 108 or collectively as orthogonal sockets 108). The orthogonal sockets 108 may each receive light from (or transmit light to when the orthogonal sockets 108 are part of an optical receiver) the silicon interposer 104 at an angle between 0 and 90 degrees relative to a plane of the silicon interposer 104. In one example, the light may be approximately orthogonal to an optical connector that is laterally inserted into a respective orthogonal socket 108, as discussed in further details below.

In one example, the optical connectors (discussed in further details below) inserted into the orthogonal sockets 108 may each be optically coupled to a ribbon fiber $110_1$-$110_n$ (also referred to herein individually as a ribbon fiber 110 or collectively as ribbon fibers 110). Although FIG. 1 illustrates ribbon fibers 110, the ribbon fibers 110 may be replaced with loose fibers in a tube, but arranged in a one dimensional or two dimensional array in the optical ferrule or optical connector, discussed below. The ribbon fibers 110 may be held by a jumper holder 112. A single jumper holder 112 may hold a plurality of ribbon fibers 110.

In one example, the single jumper holder 112 may be coupled to a base bracket 114. The base bracket 114 may be coupled to the electrical substrate 102. The jumper holder 112 and the base bracket 114 may have mating features that mechanically hold the jumper holder 112 to the base bracket 114, as discussed below.

As can be seen in FIG. 1, unlike previously designed socket connectors on a silicon interposer that have a support bracket and the connection interface as a single larger piece, the present disclosure separates the connection into two different parts. The support bracket portion is separated into the jumper holder 112 and the base bracket 114. The optical signal coupling portion is separated into the optical connectors, discussed in further details below.

As result, the optical connectors can be relatively small along with the orthogonal sockets 108. Due to the smaller size, less area is used on the silicon interposer 104, thereby, reducing the overall size of the silicon interposer 104.

In addition, by separating the jumper holder 112 and the base bracket 114, the force applied to connect the optical connectors can be removed from silicon interposer 104 and onto the electrical substrate 102 where the base bracket 114 is located. For example, the jumper holder 112 may be coupled to the base bracket 114 and the optical connectors can be laterally inserted into the orthogonal sockets 108.

In contrast, previously designed socket connectors may apply a vertical force directly onto the silicon interposer 104. The force may cause damage the silicon interposer 104, which may negatively affect the operation of the optical transmitter 100. The design of the two part optical connectors of the present disclosure avoids potentially damaging the silicon interposer 104 by shifting the force onto the electrical substrate 102 and using laterally inserted optical connectors.

Figure 2:
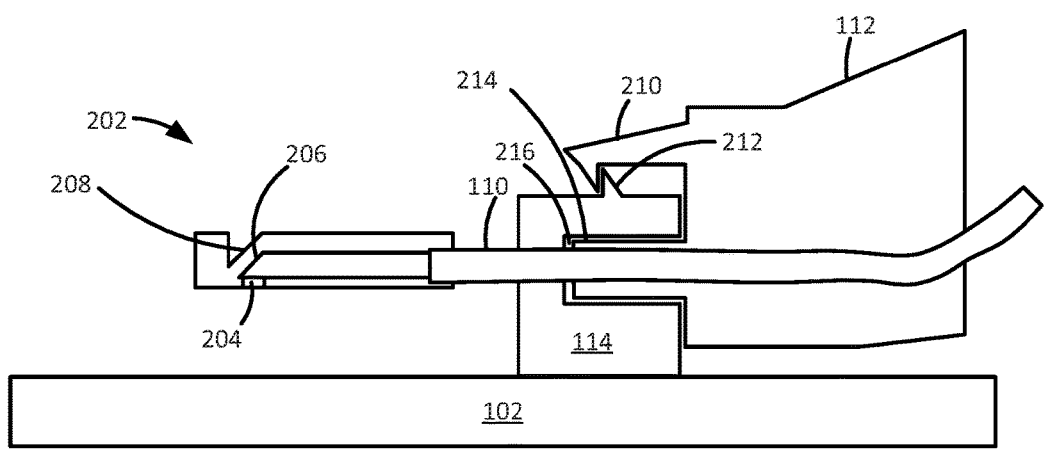
FIG. 2 is a block diagram of a side view of an optical connector of the present disclosure.

FIG. 2 illustrates a side view of an example of an optical connector 200. The optical connector 200 may include the jumper holder 112 to hold the ribbons 110, as described above, and the base bracket 114 coupled to the electrical substrate 102. The jumper holder 112 may be coupled to the base bracket 114.

Figure 4:
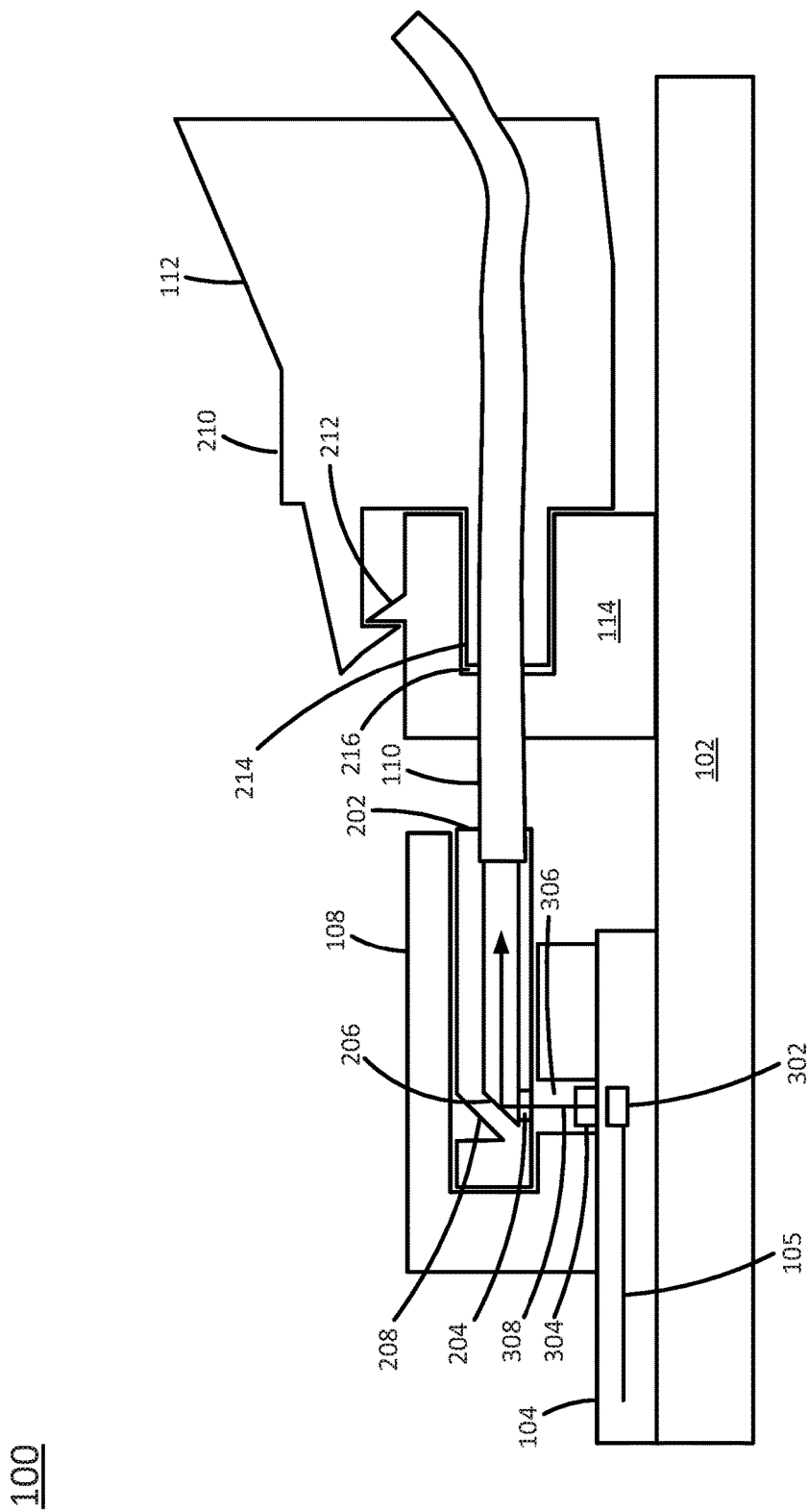
FIG. 4 is a block diagram of a side view of the optical transmitter with the optical connectors laterally inserted into the orthogonal socket of the present disclosure.

An optical ferrule 202 may be coupled to the end of each ribbon 110$_1$-110$_n$. The optical ferrule 202 may have a ring or cap to secure the ribbon 110 and form an optical connection with a respective orthogonal socket 108, as illustrated in FIG. 4 and discussed in further detail below. The optical ferrule 202 may be fabricated from a metal or hard plastic having an optical window 204 to allow light to enter the optical ferrule 202. The optical window 204 may be a lens.

In one example, the optical ferrule 202 may be laterally inserted into a corresponding orthogonal socket 108 that is coupled to the silicon interposer 104 on the electrical substrate 102, as illustrated in FIG. 1.

The optical ferrule 202 may optically mate with the orthogonal socket 108. For example, the optical window 204 may be aligned with an opening (illustrated in FIG. 3) of the orthogonal socket 108 from which light enters the orthogonal socket 108. In one example, the optical ferrule 202 may include an alignment feature to align the optical window 204 in the orthogonal socket 108. The alignment feature may include any mechanical feature. In one example, the alignment feature may be created by virtue of the optical ferrule 202 bottoming out within the orthogonal socket 108.

In one example, the optical ferrule 202 may include a light turn mirror 206. The light turn mirror 206 may be a reflective surface inside of the optical ferrule 202 that redirects the light that enters through the optical window 204. In one example, a coating may be applied to a surface 208 of the optical ferrule 202 to create a reflective surface of the light turn mirror 206. The light turn mirror 206 may redirect, focus, or collimate the light approximately 90 degrees back into the ribbon fiber 110. The light may be transported through the ribbon fiber 110 to an optical receiver (not shown).

As discussed above, the optical connector 200 may split the supporting components (e.g., the jumper holder 112 and the base bracket 114) and the connecting components (e.g., the optical ferrule 202). The base bracket 114 may be coupled to the electrical substrate 102 and not the silicon interposer 104. When pressure is applied to connect the jumper holder 112 to the base bracket 114, no direct force is applied to the silicon interposer 104. As a result, potential damage to the silicon interposer 104 is avoided.

In one example, the jumper holder 112 and the base bracket 114 may have mechanical features to connect and hold the jumper holder 112 to the baes bracket 114. In one example, the mechanical features may include a spring release clasp 210 on the jumper holder 112 that mates with a notch 212 on the base bracket 114. An opening 216 in the base bracket 114 may provide alignment for the jumper holder 112. A protruding member 214 on the jumper holder 112 may be inserted into the opening 216 to align the spring release clasp 210 to the notch 212. The jumper holder 112 may then be removed by pulling up on the spring release clasp 210.

It should be noted that the above mechanical feature is one example. Other types of mechanical features to connect the jumper holder 112 to the base bracket 114 may be deployed. For example, the mechanical features may include using a mechanical fastener, using an interference fit, and the like.

Figure 3:
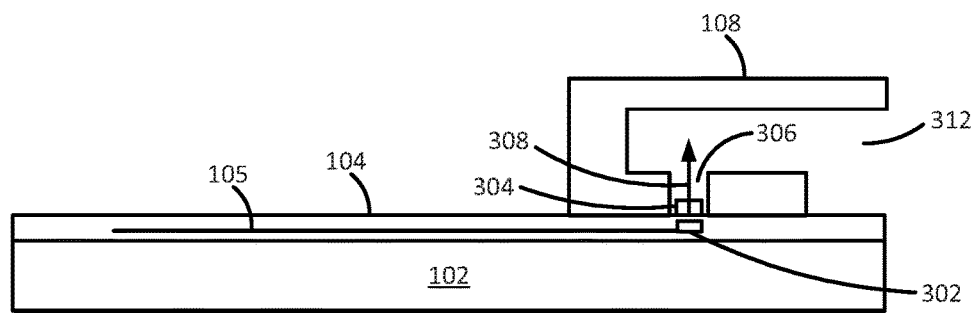
FIG. 3 is a block diagram of a side view of an orthogonal socket of the present disclosure.

FIG. 3 illustrates a block diagram of a side view of an example of the orthogonal socket 108 of the present disclosure. The orthogonal socket 108 may be coupled onto the silicon interposer 104 that is coupled to the electrical substrate 102, as described above. It should be noted that the electrical substrate 102 is not drawn to scale and may extend further to connect to the base bracket 114 as described above.

The orthogonal socket 108 may be aligned with a grating coupler 302 and a lens 304 (also referred to as an expanded beam lens). The grating coupler 302 may be at an end of a waveguide 105 to diffract a light 308 travelling on the waveguide 105 for the light 308 to eventually couple into an optical fiber. The light 308 may exit from the silicon interposer 104 towards the lens 304. The lens 304 may collimate the light 308 that exits the grating coupler 302 towards an opening 306 of the orthogonal socket 108. The opening 306 may be an area in the orthogonal socket 108 through which the light 308 enters the orthogonal socket 108.

The orthogonal socket 108 may include an alignment feature to mate with the alignment feature of the optical ferrule 202. In one example, the alignment feature may be created by sizing the orthogonal socket 108 so that when the optical ferrule 202 is fully inserted against the inner end of the orthogonal socket 108, the optical window 204 of the optical ferrule 202 and the lens 304 may be aligned.

In one example, when the optical ferrule 202 is bottomed out within the orthogonal socket 108, the optical window 204 may also be aligned with a light emitting path of the silicon interposer 104. The light emitting path may include the grating coupler 302 within the silicon interposer 104 and the expanded beam lens 304 mounted on the silicon interposer 104. The light signal 308 may travel along a silicon waveguide 105 and exit the grating coupler 302 approximately 10 degrees with respect to a surface normal of the grating coupler 302. The diameter of the light signal 308 may be expanded when it passes through the expanded beam lens 304.

In one example, the orthogonal socket 108 may include a lateral opening 312. The optical ferrule 202 may be inserted laterally into the lateral opening 312. In other words, the orthogonal socket 108 allows the optical ferrule 202 to be inserted in a direction that is orthogonal to a direction of the light 308 that is emitted from the silicon interposer 104.

In contrast, previous designed socket connectors insert the socket connector substantially parallel to the direction the light exits the silicon interposer 104. Said another way, the previous designed socket connectors are inserted vertically down into the sockets on the silicon interposer. As noted above, applying direct force onto the silicon interposer 104 may be avoided by laterally inserting the optical ferrule 202 into the orthogonal socket 108. This may avoid potential damage to the silicon interposer 104.

FIG. 4 illustrates a block diagram of a side view of the optical transmitter 100 with the optical ferrule 202 inserted into the orthogonal socket 108. The optical transmitter 100 includes the silicon interposer 104 coupled to the electrical substrate 102. The grating coupler 302 may be formed on the silicon interposer 104 and the lens 304 may be coupled to the grating coupler 302. The orthogonal socket 108 may be aligned with the lens 304 such that the light 308 enters the optical window 306 of the orthogonal socket 108.

The base bracket 114 may be coupled to the electrical substrate 102. The jumper holder 112 holding the ribbon fibers 110 may be connected to the base bracket 114. The jumper holder 112 may be coupled to the base bracket 114 using the mechanical features described above (e.g., the spring release clasp 210 coupled to the notch 212 and the protruding member 214 inserted into the opening 216).

It should be noted that FIG. 4 illustrates a cross section of the optical transmitter 100. Thus, the optical ferrule 202 appears to be rectangular. However, it should be noted that the optical ferrule 202 may be any shape that is formed around the ribbon fiber 110. In addition, the orthogonal socket 108 may have a corresponding shape that is slightly larger than the optical ferrule 202. As a result, the optical ferrule 202 may slide into the opening 312 of the orthogonal socket 108. In addition, it should be noted that each one of the plurality of optical ferrules 202 may be inserted into a single corresponding orthogonal socket 108 as illustrated in the top view of FIG. 1. In other words, if there is an array of five orthogonal sockets 108, there may be five optical ferrules 202.

Referring back to FIG. 4, when the optical ferrule 202 is optically aligned with the orthogonal socket 108, the optical window 204 of the optical ferrule 202 may be aligned with the optical window 306 of the orthogonal socket 108. The light 308 may travel through the optical window 306 and the optical window 204 and be redirected by the light turn 206 inside of the optical ferrule 202. The light 308 may then travel through the ribbon fiber 110.

Figure 5:
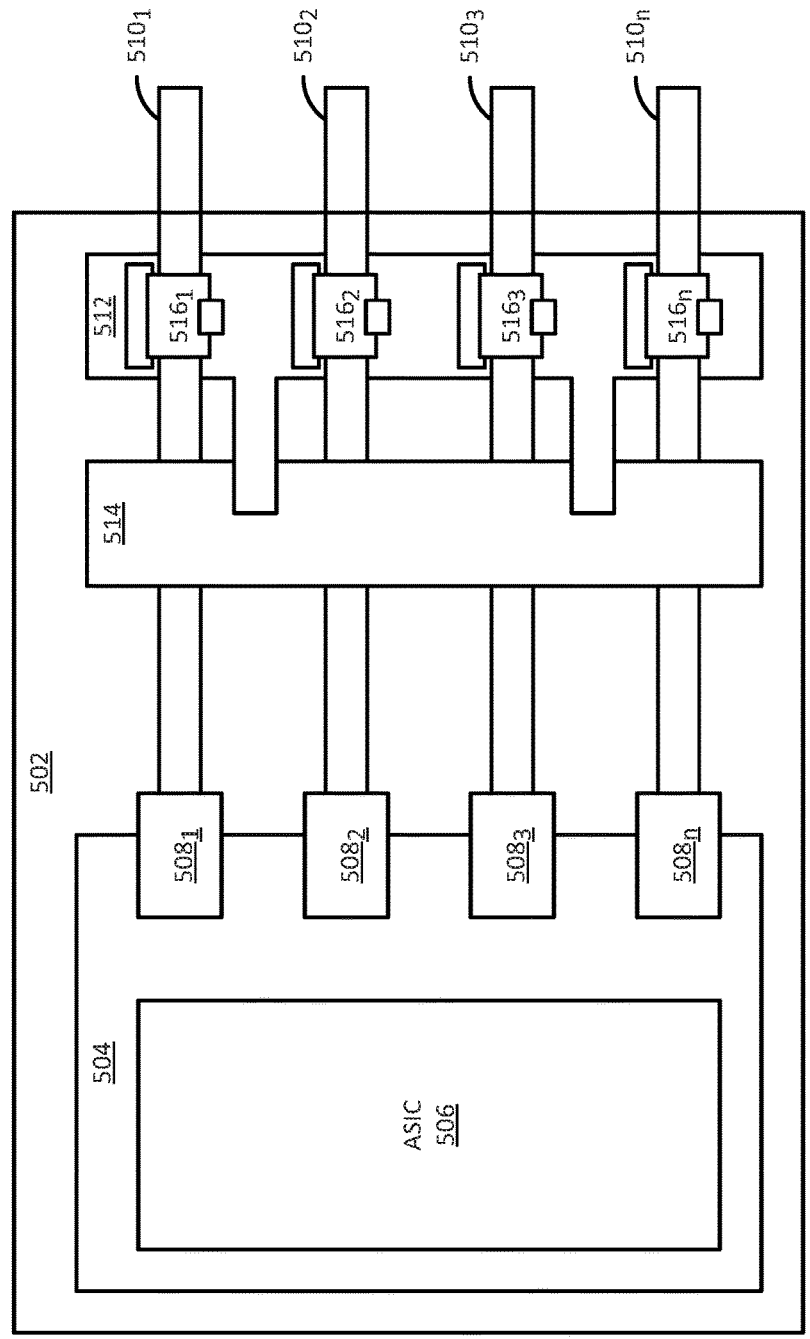
FIG. 5 is a block diagram of a top view of another example of an optical transmitter with laterally mated connectors of the present disclosure.

FIG. 5 illustrates a top view of another example of an optical transmitter 500 of the present disclosure. The optical transmitter 500 may be similar to the optical transmitter 100 illustrated in FIGS. 1-4. For example, the optical transmitter 500 may have an electrical substrate 502, a silicon interposer 504, and an electrical die 506. The optical transmitter 500 may include a plurality of orthogonal sockets $508_1$ to $508_n$.

A jumper holder 512 may hold a plurality of ribbon fibers $510_1$-$510_n$. Each ribbon fiber 510 may have an optical connector (e.g., similar to the optical ferrule 202) connected to an end of the ribbon fiber 510 that is inserted laterally into one of the orthogonal sockets 508. The jumper holder 512 may be coupled to a base bracket 514 that is coupled to the electrical substrate 502.

In one example, the jumper holder 512 may include a plurality of retention clips $516_1$ to $516_n$ (also referred to herein individually as a retention clip 516 or collectively as retention clips 516). In one example, the retention clips may be flip-up retention clips. For example, a top portion may flip up to release a respective ribbon fiber 510 and flip down and be clasped closed to secure the respective ribbon fiber 510.

The retention clips 516 may allow for easy maintenance and replacement should a particular ribbon fiber 510 be defective. For example, the ribbon fibers $510_1$-$510_n$ may be connected and tested one-by-one to ensure the connections are made and the ribbon fibers $510_1$-$510_n$ each are functioning properly. In one example, the ribbon fiber $510_3$ may be detected to be defective. The retention clip $516_3$ may be opened and the ribbon fiber $510_3$ may be removed and replaced. However, without the retention clips 516, all of the ribbon fibers 510 may be disconnected and the jumper holder 512 disconnected from the base bracket 514. Thus, having the retention clips 516 may provide for easier maintenance and replacement should a particular ribbon fiber 510 be defective.

Figure 6:
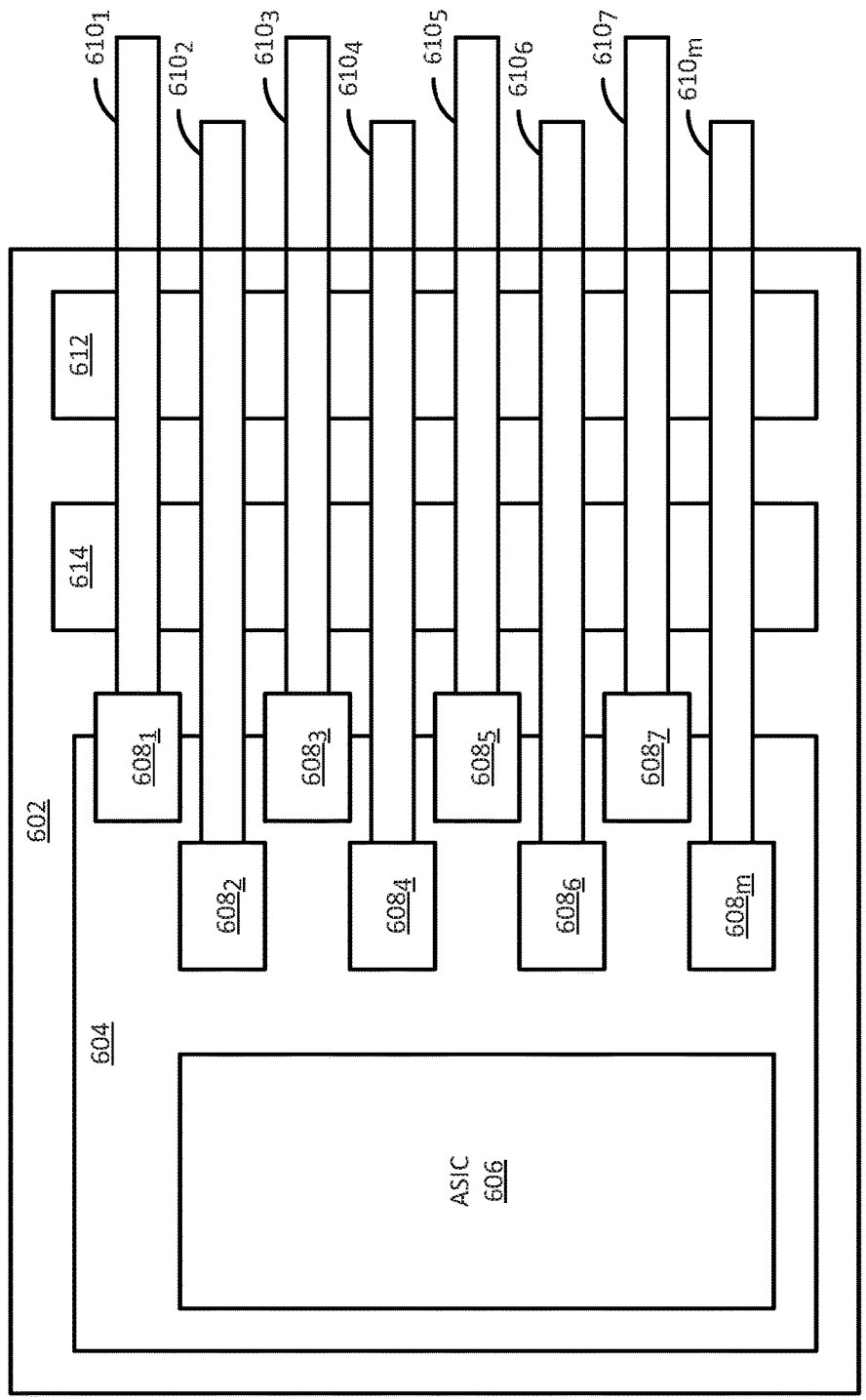
FIG. 6 is a block diagram of a top view of another example of an optical transmitter with staggered arrays of laterally mated connectors of the present disclosure.

FIG. 6 illustrates a block diagram of a top view of another example of an optical transmitter 600 of the present disclosure. The optical transmitter 600 may be similar to the optical transmitter 100 illustrated in FIGS. 1-4. For example, the optical transmitter 600 may have an electrical substrate 602, a silicon interposer 604, and an electrical die 606. The optical transmitter 600 may include a plurality of orthogonal sockets $608_1$ to $608_m$.

A jumper holder 612 may hold a plurality of ribbon fibers $610_1$-$610_m$. Each ribbon fiber 610 may have an optical connector (e.g., similar to the optical ferrule 202) connected to an end of the ribbon fiber 610 that is inserted laterally into one of the orthogonal sockets 608. The jumper holder 612 may be coupled to a base bracket 614 that is coupled to the electrical substrate 602.

In one example, the plurality of ribbon fibers 610 may be arranged in a plurality of staggered ribbon fiber arrays with corresponding staggered arrays of the orthogonal sockets 608. For example, the orthogonal sockets $608_1$, $608_3$, $608_5$, and $608_7$ may be arranged in a first array or row. The orthogonal sockets $608_2$, $608_4$, $608_6$, and $608_m$ may be arranged in a second array or row behind the first array. The second array may be staggered. In other words, the second row may be offset from the first array to allow space for the ribbon fibers 510 to run between the orthogonal sockets 608 in the first array and reach the respective orthogonal sockets 608 in the second array.

The ribbon fibers $610_1$, $610_3$, $610_5$, and $610_7$ may be laterally inserted into the orthogonal sockets $608_1$, $608_3$, $608_5$, and $608_7$, respectively. The ribbon fibers $610_2$, $610_4$, $610_6$, and $610_m$ may be laterally inserted into the orthogonal sockets $608_2$, $608_4$, $608_6$, and $608_m$, respectively. Thus, more orthogonal sockets 608 may be fit onto a smaller space of the silicon interposer 604, thereby allowing for more connections of ribbon fibers 610.

Figure 7:
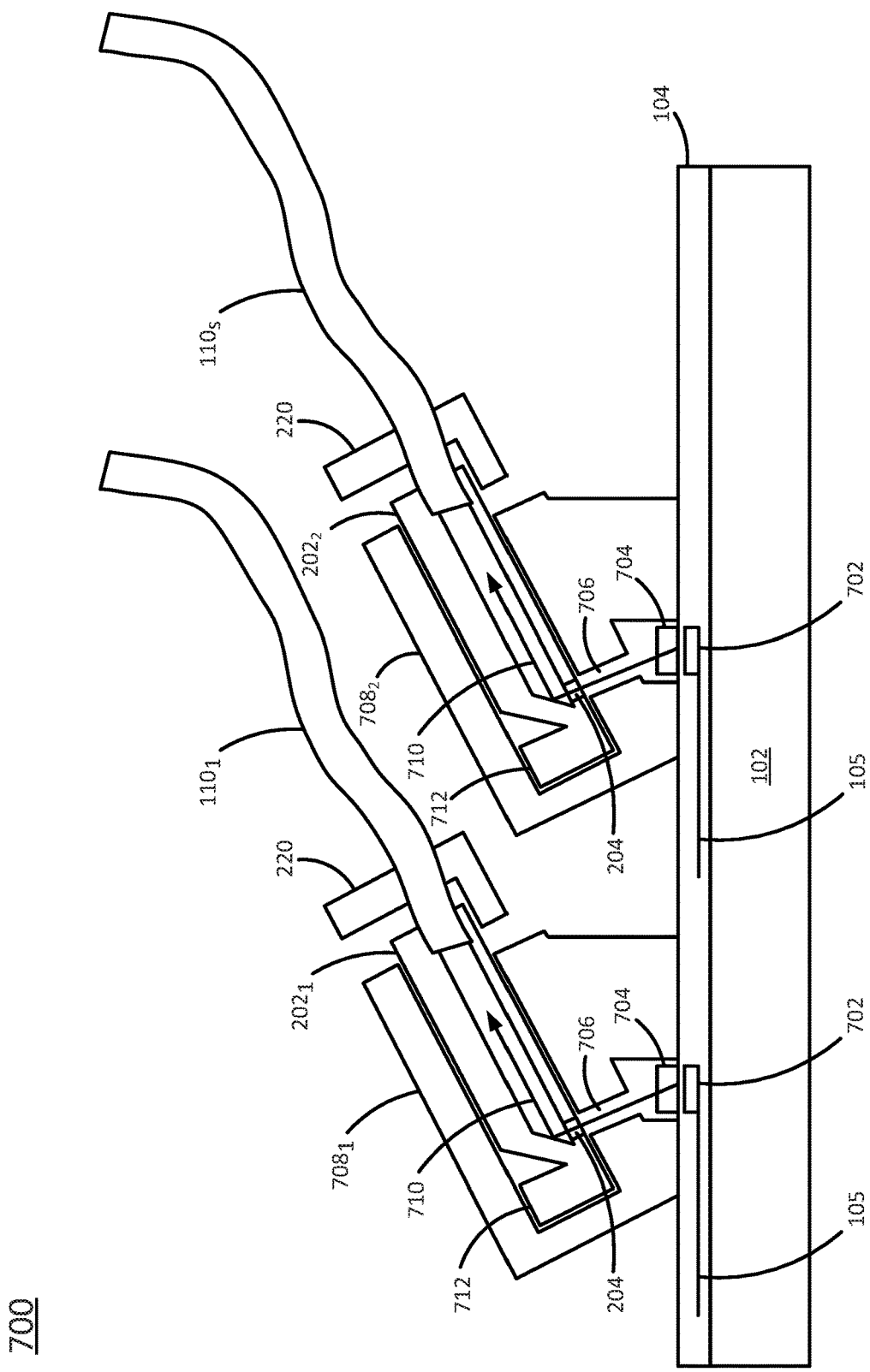
FIG. 7 is a block diagram of a side view of an example of tilted orthogonal sockets with optical connectors laterally inserted into the tilted orthogonal sockets of the present disclosure.

FIG. 7 illustrates a block diagram of a side view of an example of an orthogonal sockets $708_1$ and $708_2$ that are tilted. For example, the orthogonal socket 708 may be similar to the orthogonal sockets 108 in that the orthogonal socket 708 may be aligned with a lens 704 that is coupled to a grating coupler 702. The grating coupler 702 may be formed on the silicon interposer 104 that is coupled on to the electrical substrate 102.

However, unlike the orthogonal socket 108, an opening 712 of the orthogonal socket 708 may be tilted or positioned at an angle relative to the silicon interposer 104 and the electrical substrate 102. The optical ferrule $202_1$ and the optical ferrule $202_2$ may be also laterally inserted at an angle into the respective orthogonal sockets $708_1$ and $708_2$.

When the optical ferrules $202_1$ and $202_2$ are laterally inserted at an angle, the optical windows 204 of the optical ferrules $202_1$ and $202_2$ may be aligned with the optical windows 706 of the orthogonal sockets $708_1$ and $708_2$. In addition, the grating couplers 702 and the lenses 704 may be designed to emit light 710 at an angle through the optical windows 706 and the optical windows 204. As a result, even though the orthogonal sockets $708_1$ and $708_2$ are tilted, the optical ferrules $202_1$ and $202_2$ may still be laterally inserted in a direction that is orthogonal to a direction that the light 710 enters the orthogonal sockets $708_1$ and $708_2$.

In one example, tilting the orthogonal sockets $708_1$ and $708_2$ may allow more orthogonal sockets to be mounted to the silicon interposer 104 while minimizing the amount of surface area used on the silicon interposer 104. In one example, the orthogonal sockets $708_1$ and $708_2$ may be abutted against one another (e.g., touching each other) to save even more space on the silicon interposer 104 and deploy more orthogonal sockets on the silicon interposer 104.

In one example, the optical connector 200 may include a support member 220. The support member 220 may help support the weight of the optical ferrule 202 at the end of the ribbon fiber 110. As a result, the support member 220 may allow the optical ferrule 202 to be inserted into the corresponding orthogonal socket 708 more easily.

In one example, the support member 220 may be a backward "L" shape. The bottom portion of the backward "L" shape may help support the weight of the optical ferrule 202. The top portion of the "L" shape may be connected to the jumper holder 112. Although a backward "L" shape is used in FIG. 7, it should be noted that the support member 220 may have any shape that can support the weight of the optical ferrule 202 and provide stability of the optical ferrule 202 against the ribbon fiber 110.

Thus, the present disclosure provides examples of different laterally inserted optical connectors and orthogonal sockets. The split design of the optical connector allows less space to be consumed by the orthogonal sockets on the silicon interposer. As a result, the dimensions of the silicon interposer may be reduced, which may reduce costs and increase production efficiency.

In addition, the split design of the optical connector with the lateral insertion of the optical connector allows force to be removed from the silicon interposer when the optical connectors are connected. Rather than applying a direct force on the silicon interposer, the force may be transferred to the electrical substrate via the base bracket and jumper holder of the optical connector.

It will be appreciated that variants of the above-disclosed and other features and functions, or alternatives thereof, may be combined into many other different systems or applications. For example, the optical receiver may be similar to the optical transmitter 100 described above, but have a different light path direction. The grating couplers and lenses for the optical receiver and transmitter may be adjacently located within the optical connector. Also, fibers from external light sources may be optically coupled to the silicon interposer similarly. Various presently unforeseen or unanticipated alternatives, modifications, variations, or improvements therein may be subsequently made by those skilled in the art which are also intended to be encompassed by the following claims.

The invention claimed is:

1. An optical connector, comprising:
   a jumper holder to hold a plurality of ribbon fibers;
   a base bracket coupled to an electrical substrate to mate with the jumper holder; and
   an optical ferrule coupled to an end of each one of the plurality of ribbon fibers, wherein the optical ferrule is laterally inserted into a corresponding orthogonal socket that is coupled to a silicon interposer on the electrical substrate to optionally mate the optical ferrule to the orthogonal socket, wherein the optical ferrule comprises:
      an optical window to allow a light signal to enter the optical ferrule; and
      a light turn to redirect the light signal into a respective ribbon fiber.

2. The optical connector of claim 1, wherein the jumper holder comprises a retention clip for each one of the plurality of ribbon fibers.

3. The optical connector of claim 2, wherein the retention clip comprises a flip-up retention clip.

4. The optical connector of claim 1, wherein the plurality of ribbon fibers comprises multiple staggered ribbon fiber arrays.

5. The optical connector of claim 1, wherein optical ferrule is laterally inserted into the corresponding orthogonal socket at an angle.

6. The optical connector of claim 1, wherein the orthogonal socket comprises an optical window to allow the light signal to enter the orthogonal socket.

7. The optical connector of claim 6, wherein the orthogonal socket comprises an alignment feature to align the optical window of the optical ferrule and the optical window of the orthogonal socket.

8. The optical connector of claim 1, further comprising:
   a support member coupled to the optical ferrule.

* * * * *